United States Patent
Kadowaki et al.

(10) Patent No.: US 7,188,054 B2
(45) Date of Patent: Mar. 6, 2007

(54) SIGNAL PROCESSING METHOD, SIGNAL PROCESSING PROGRAM, RECORDING MEDIUM STORING THE SIGNAL PROCESSING PROGRAM AND SIGNAL PROCESSOR

(75) Inventors: Soichi Kadowaki, Kawasaki (JP); Kozo Umeda, Sapporo (JP); Tomonori Goto, Sapporo (JP)

(73) Assignee: Mitutoyo Corporation, Kawasaki (JP)

( * ) Notice: Subject to any disclaimer, the term of this patent is extended or adjusted under 35 U.S.C. 154(b) by 44 days.

(21) Appl. No.: 11/037,936

(22) Filed: Jan. 18, 2005

(65) Prior Publication Data
US 2005/0159931 A1 Jul. 21, 2005

(30) Foreign Application Priority Data
Jan. 19, 2004 (JP) .............................. 2004-010918

(51) Int. Cl.
G06F 15/00 (2006.01)
H03F 1/26 (2006.01)
H04B 15/00 (2006.01)

(52) U.S. Cl. ...................... 702/190; 702/191; 702/196

(58) Field of Classification Search ................ 702/129, 702/190, 191, 194, 196, 189, 155–158, 166, 702/167, 170
See application file for complete search history.

(56) References Cited

U.S. PATENT DOCUMENTS

| | | | | |
|---|---|---|---|---|
| 4,901,253 A * | 2/1990 | Iwano et al. ................ 345/419 |
| 5,422,990 A * | 6/1995 | Siverbrook et al. ......... 345/442 |
| 6,701,266 B2 * | 3/2004 | Kadowaki et al. ............ 702/94 |
| 6,701,267 B2 * | 3/2004 | Noda et al. ................... 702/95 |
| 6,816,799 B2 * | 11/2004 | Yu et al. ....................... 702/94 |
| 6,885,980 B2 * | 4/2005 | Kadowaki et al. .......... 702/190 |
| 6,954,721 B2 * | 10/2005 | Webber ....................... 702/189 |
| 2001/0015142 A1* | 8/2001 | Fangmeyer et al. .......... 101/32 |
| 2003/0115007 A1* | 6/2003 | Lipp ............................ 702/94 |
| 2005/0160211 A1* | 7/2005 | Kadowaki et al. .......... 710/300 |
| 2006/0020428 A1* | 1/2006 | Baxter et al. ............... 702/189 |

FOREIGN PATENT DOCUMENTS

| JP | 8-278343 | 10/1996 |
|---|---|---|
| JP | 08278343 A * | 10/1996 |
| JP | 9-179992 | 7/1997 |

\* cited by examiner

Primary Examiner—Michael Nghiem
Assistant Examiner—Meagan S. Walling
(74) Attorney, Agent, or Firm—Rankin, Hill, Porter & Clark LLP

(57) ABSTRACT

A signal processing method is disclosed, where, after inputting a measurement data weighted-spline filter formula is selected to calculate an initial value of a spline filter, weight is adjusted, spline filter output is calculated, convergence is judged thereafter. When the weight is not judged converged, the weight is updated and the weight adjusting and spline filter output calculation are repeated, to conduct a robust spline filtering on the measurement data.

8 Claims, 13 Drawing Sheets

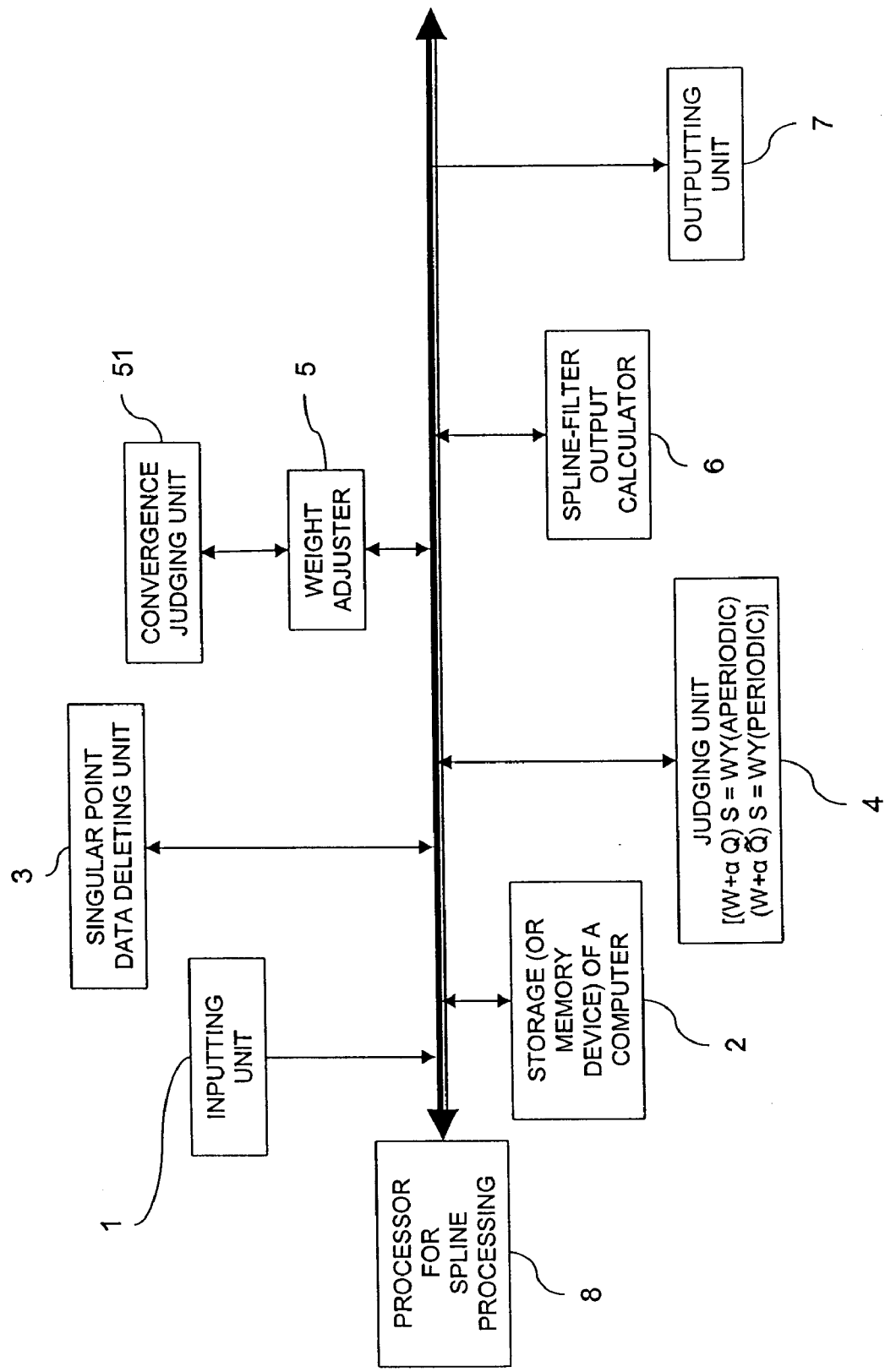

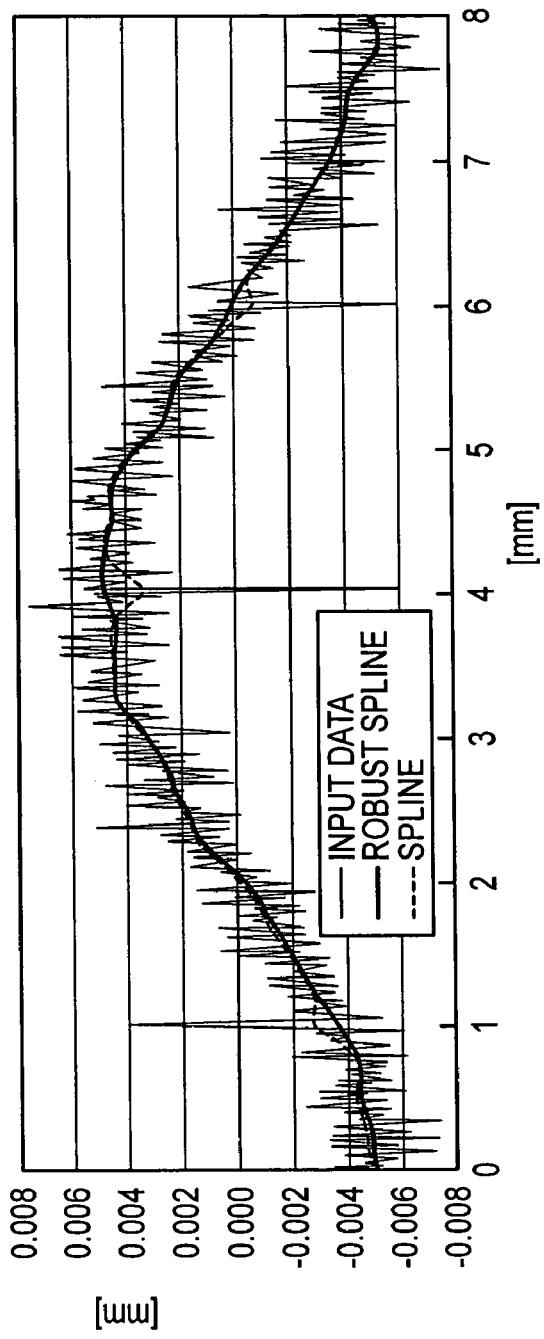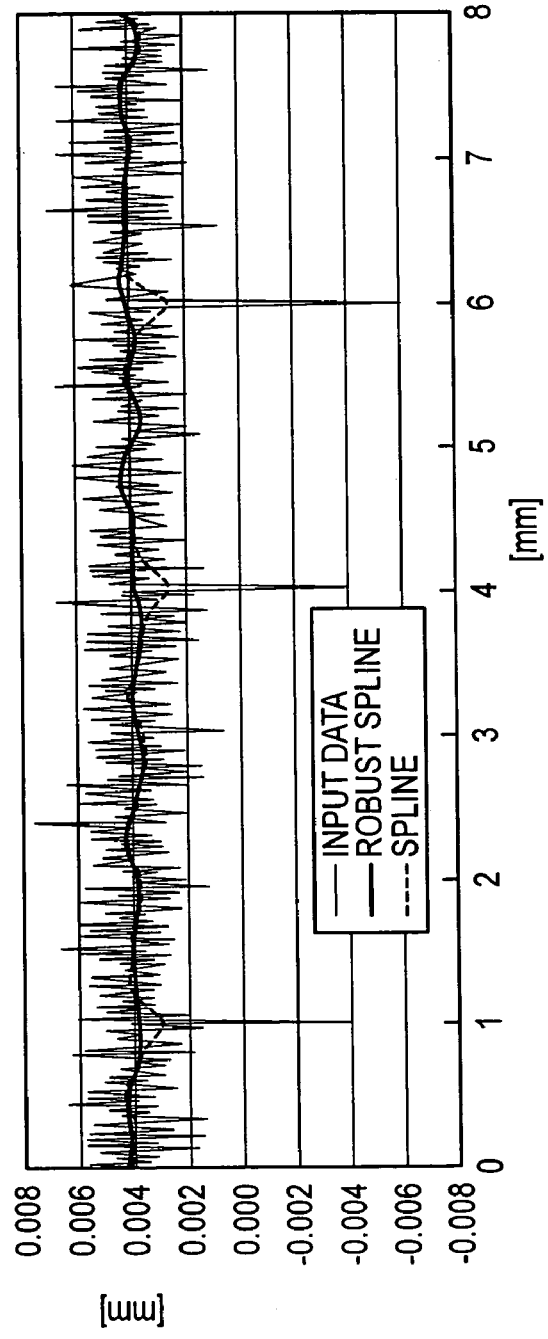
FIG. 3A
FIG. 3B

FIG.5
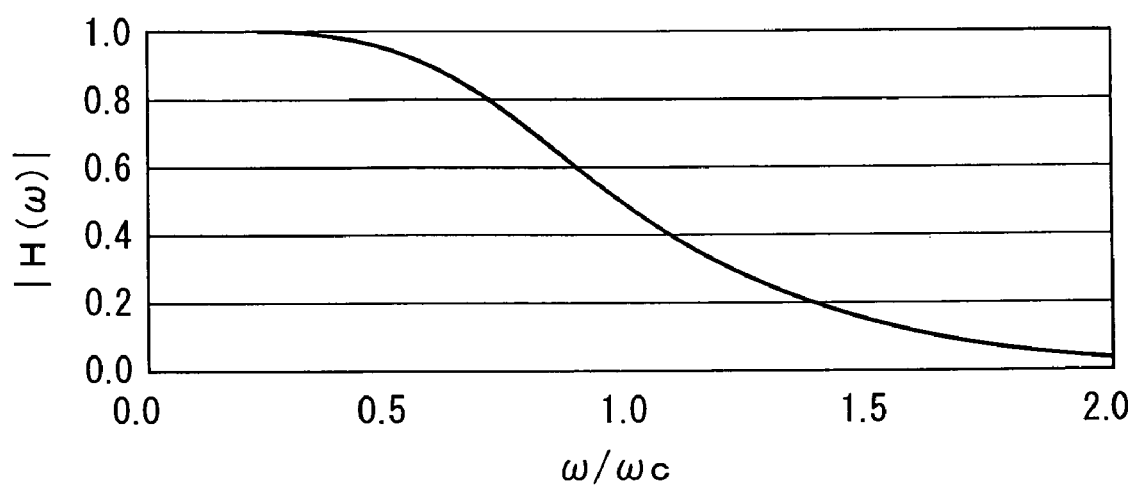
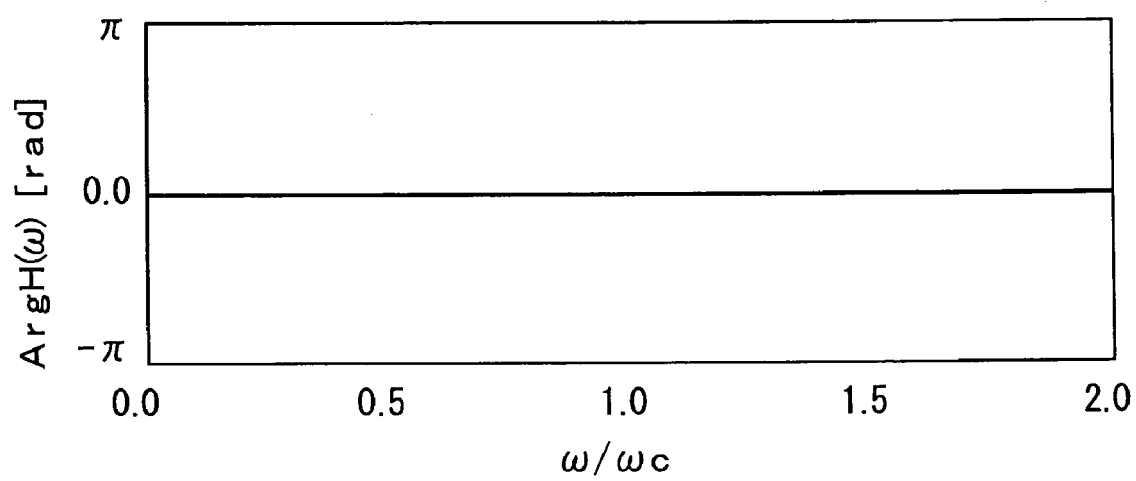

SIGNAL PROCESSING METHOD, SIGNAL PROCESSING PROGRAM, RECORDING MEDIUM STORING THE SIGNAL PROCESSING PROGRAM AND SIGNAL PROCESSOR

BACKGROUND OF THE INVENTION

1. Field of the Invention

The present invention relates to a signal processing method, more specifically, relates to a signal processing method for filtering a data obtained by measuring surface texture of an object to be measured such as roughness or a contour etc. of the object to be measured.

2. Description of Related Art

Measuring instruments for measuring surface texture of an object to be measured e.g. contour, roughness, waviness, etc. of a surface of the object to be measured such as a coordinate measuring machine for measuring a three-dimensional shape of the object to be measured, a form measuring machine or an image measuring machine for measuring a two-dimensional contour, a roundness measuring machine for measuring roundness, and further, a surface roughness tester for measuring waviness and roughness etc. of the surface of the object to be measured have been conventionally known. In such measuring instruments a contact type or non-contact type sensor and the object to be measured are moved relatively, to collect measurement data of the surface of the object to be measured.

Usually, disturbances such as noise are contained in thus collected measurement data.

Since the disturbance is usually an electric and magnetic induction noise etc. containing high-frequency components, when the contour of the surface of the object is to be measured, the surface roughness and the waviness can be the disturbance of the contour.

In order to remove the disturbance as necessary, the measurement data is often filtered to remove, for example, the high-frequency components. A spline filter is known as such a filter (refer to Document 1: Japanese Patent Laid-Open Publication No. HEI 9-179992, and Document 2: Japanese Patent Laid-Open Publication No. HEI 8-278343). Further, a robust spline filter is known for applying weight on each measurement data and for repeating to update of the weight until this weighting is optimized.

However, the robust spline filter has been applicable to curve data, but it has not been applicable to curved surface data obtained by measuring a surface area.

SUMMARY OF THE INVENTION

A primary object of the present invention is to provide a signal processing method having a high reliability, which allows data obtained by measuring the surface area to be utilized, maintaining a distinctive feature of the spline filter, and is also capable of being applied to surface measurement data such as the surface texture of the object to be measured, and in addition hereto, to provide a signal processing program, a recording medium storing the signal processing program and a signal processor.

A signal-processing method according to an aspect of the present invention is for filtering a measurement data obtained by measuring the surface area the method including: a measurement data input step for inputting the measurement data; a selecting step for selecting a predetermined weighted spline filter formula; an initializing step for applying weight on the measurement data by a unit matrix to obtain an initial value of a spline filter output; a weight-adjusting step for adjusting and determining the weight on the measurement data; a spline filter output calculating step for calculating the spline filter output using the weight determined in the weight-adjusting step; a convergence test step for determining a convergence of the weight; and an output step for outputting a signal-processing result based on the spline filter output, wherein, when it is not judged that the weight is converged in the convergence judging step, the weight is updated and the weight-adjusting step and the spline-filter output-calculating step are repeated and wherein a smoothing spline curved surface corresponding to the measurement data is generated, thereby to conduct a robust spline filtering on the measurement data.

In accordance with this invention, the weighted-spline filter formula is selected and the spline curved surface as a spline filtering output is repeatedly calculated while sequentially updating its weight based upon the selected spline filter formula, so that the robust-spline filtering having the filter output as the signal processing result of the spline curve when the weight is converged can be applied on the measurement data. Accordingly a deformation at the start or end area of the measurement data (an end-effect) can be prevented, and the shape contained in the measurement data can be extracted without being influenced by trackability for waviness component and the noise component in the measurement data. As a result, the filtering with excellent shape trackability can be conducted thereby further enhancing the reliability of the measurement data.

Herein, the measurement data obtained by measuring the surface area refers to, for example, data etc. obtained by scanning the surface of the object to be measured with the coordinate measuring machine or the surface texture measuring machine. That is, it refers to data to be represented with height data f (x, y) from the surface with respect to a sampling position (x, y).

In the signal-processing method according to the above aspect of the present invention, the weight determined in the weight-adjusting step is preferably adjusted to smaller value as a deviation of the measurement data from the spline curve calculated by the weighted-spline filter formula becomes greater.

According to the above arrangement, since the weight of the measurement data is adjusted smaller as the deviation of the measurement data from the spline curve calculated by the weighted-spline filter formula becomes greater, robust-spline filtering without being influenced by singular point data contained in the measurement data is provided. Specifically the spline curve is repeatedly calculated while applying small weight on the measurement data remote from the spline curve and applying heavy weight on the measurement data near the spline curve. Then, the spline curve is gradually approximated to the original shape component (for example, a true shape value etc. of the object to be measured) contained in the measurement data. And, the final spline curve when the weight is judged converged is regarded as a shape component having sufficiently small error relative to the original shape component. As a result, the extremely accurate robust-spline filtering can be conducted.

In the signal-processing method according to the above aspect of the present invention, the weight is preferably judged converged when amount of weight-change in the weight adjusting step becomes a predetermined value or less in the convergence judging step, According to the above arrangement, since the weight is judged converged when the change in the weight during the repeated-loop process becomes a predetermined value or less, increase in a processing time on account of the unnecessary repetitive loop can be avoided and time required for robust spline filter processing can be reduced. Further, since the error of spline curve is considered small enough relative to the original shape component contained in the measured data when amount of weight-change in the weight adjusting step becomes a predetermined value or less, extremely accurate robust-spline filtering can be conducted.

In the signal-processing method according to the above aspect of the present invention, the output step preferably includes: a weight-updating step for updating the weight to 1 when the weight of the measurement data exceeds a predetermined value, a spline filter re-output calculating step for calculating the spline filter output, based upon the updated weight, and a signal process result output step for outputting the spline filter output in the spline filter re-output calculating step as a signal processing result.

According to the above arrangement when the weight of the measurement data exceeds a predetermined value the weight is updated to 1 and when the weight of the measured data is not greater than a predetermined value the weight is updated to 0, and the spline filter output is re-calculated to be outputted as a signal processing result.

Specifically when the weight is judged converged after repeating the weight adjusting step and the spline filter output calculating step, the measurement data where its weight exceeds a predetermined value is considered as an efficient data with its weight being updated to 1, however, the measurement data where its weight is not greater than a predetermined value is considered as an inefficient data with its weight being updated to 0, and the spline filter output after the updating is obtained again so that the robust spline filter processing can be more securely conducted. Then, since the result is outputted as the signal-processing result, a spline curve with sufficiently small error relative to the original shape component contained in the measurement data can be calculated. Consequently, robust spline filtering with excellent shape trackability can be achieved.

Also, in the present invention, the measurement data inputting step preferably includes a step of deleting singular point data separated locally as against the measurement data.

In accordance with this invention, due to, for example, the strong induced noise occurred from power appliances located in a factory etc., data which has been locally protuberant and has been separated, for example, data which is extremely different from that of data on both sides can be pre-deleted as obviously singular point data, so a reliability of the robust-spline filter process is further enhanced.

The signal process program of the present invention causes a computer to execute the above-mentioned signal processing method. Also, the recording medium of the present invention has the above-mentioned signal process program recorded computer-readably. And, the signal processing unit of the present invention causes a computer to execute the above-mentioned signal processing program.

With the configuration as described above, given that the computer having a CPU (Central Processing Unit) and a memory (memory device) is built-in the signal processing unit and the program is configured so as for computer to execute each step, parameters can be easily change, for example, various parameters including decision of the separation quantity according to the dimension of the measurement data in addition to the weight adjustment or the convergence determination etc. And, the recording medium with this program recorded therein may be directly inserted into the computer, thereby to install the program in the computer, and a read device for reading out information of the recording medium may be externally attached to the computer, thereby to install the program in the computer from this read device. Additionally, the program may be supplied to and installed in the computer via communication lines such as an Internet, a LAN cable, and a telephone circuit, or a wirelessly.

BRIEF DESCRIPTION OF THE DRAWINGS

FIG. 2 is a functional block diagram of a signal-processing device in the first reference technology;

FIG. 3A and FIG. 3B are illustrations comparing a result of spline processing and a result of robust spline processing for one-dimensional time-series data in the first reference technology;

FIG. 5 is an illustration showing transfer characteristic of the signal-processing method according to the present invention;

DETAILED DESCRIPTION OF PREFERRED EMBODIMENT(S)

Figure 1:
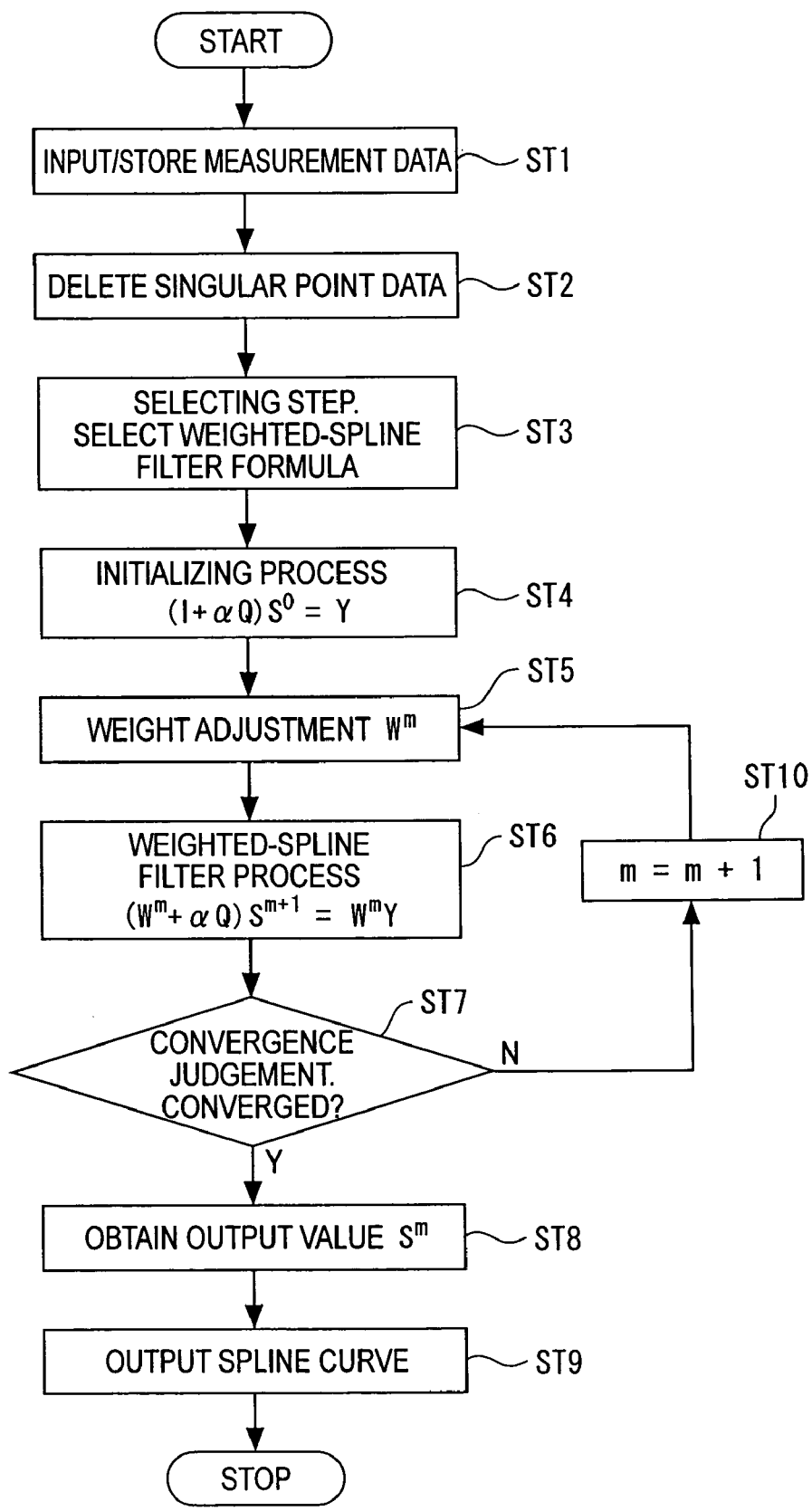
FIG. 1 is a flowchart showing signal-processing process in a signal-processing method according to a first reference technology.

The signal processing method of the present invention primarily relates to a signal processing method of performing a filter process for the curved surface data obtained by measuring the surface area; however the robust spline filter (spline filter) for the curve data is shown as a reference technology on the premise of explaining the present invention.

<First Reference Technology>

Initially, weighted spline filter will be described below.

As an example, when the number of data is represented by n, measurement data is represented by $y_k$ ($k=0, 1, \ldots, n-1$) and spline function is represented by s, a spline filter is obtained by minimizing sum of squares of residual error relative to measurement data $$\sum_{k=0}^{n-1}(y_k - s(x_k))^2 \qquad (1)$$

under the condition that spline energy $$\int_a^b \left\{\frac{d^2 s(x)}{dx^2}\right\}^2 dx \qquad (2)$$

is minimized.

In other words, when I(s) is represented by the following formula, $$I(s) = \sum_{k=0}^{n-1}\{y_k - s(x_k)\}^2 + \lambda \int_a^b \left\{\frac{d^2 s(x)}{dx^2}\right\}^2 dx \qquad (3)$$

the spline filter is obtained by minimizing the I(s) (where $\lambda$ represents Lagrange constant).

When weight for the residual error at respective measurement point is represented by $w_k$ (k=0, 1, ..., n−1), following formula adapted to weighted spline filter can be obtained.

$$I(s) = \sum_{k=0}^{n-1} w_k \{y_k - s(x_k)\}^2 + \lambda \int_a^b \left\{\frac{d^2 s(x)}{dx^2}\right\}^2 dx \qquad (4)$$

The spline function s is digitized at a constant pitch where the second term is modified as $$\alpha \sum_{k=0}^{n-1} \nabla^2 s(x_k) \qquad (5)$$

Then, following equation is established.

$$I(s) = \sum_{k=0}^{n-1} w_k \{y_k - s(x_k)\}^2 + \alpha \sum_{k=0}^{n-1} \nabla^2 s(x_k) \qquad (6)$$

In the above:

$$\nabla^2 s(x_k) = s(x_{k+1}) - 2s(x_k) + s(x_{k-1}) \qquad (7)$$

Accordingly, a value $s_k$ of discrete spline for minimizing I(s) satisfies the following formula.

$$\frac{\partial I(s_0, s_1, \cdots s_{n-1})}{\partial s_k} = 0 \qquad (8)$$
$$k = 0, 1, \cdots, n-1$$

The weighted spline filter is defined as a spline function for minimizing I(s) in the formula (6).

In order to represent the weighted spline filter for non-periodic measurement data as a matrix, when a boundary condition of non-periodic measurement is:

$$\nabla^2 s(x_0) = 0 \quad \nabla^2 s(x_{n-1}) = 0 \qquad (9)$$

since following formula, $$\frac{\partial I}{\partial s_0} = -2w_0(y_0 - s_0) = 2\alpha(s_2 - 2s_1 + s_0) \qquad (10)$$

$$\frac{\partial I}{\partial s_1} = -2w_1(y_1 - s_1) + 2\alpha(s_3 - 4s_2 + 5s_1 - 2s_0)$$

$$\frac{\partial I}{\partial s_k} = -2w_k(y_k - s_k) +$$
$$2\alpha(s_{k+2} - 4s_{k+1} + 6s_k - 4s_{k-1} + s_{k-2})$$
$$k = 2, 3, \cdots, n-3$$

$$\frac{\partial I}{\partial s_{n-2}} = -2w_{n-2}(y_{n-2} - s_{n-2}) +$$
$$2\alpha(s_{n-4} - 4s_{n-3} + 5s_{n-2} - 2s_{n-1})$$

$$\frac{\partial I}{\partial s_{n-1}} = -2w_{n-1}(y_{n-1} - s_{n-1}) + 2\alpha(s_{n-3} - 2s_{n-2} + s_{n-1})$$

is established by substituting Q as $$Q = \begin{pmatrix} 1 & -2 & 1 & & & & \\ -2 & 5 & -4 & 1 & & & \\ 1 & -4 & 6 & -4 & 1 & & \\ & \ddots & \ddots & \ddots & \ddots & \ddots & \\ & & 1 & -4 & 6 & -4 & 1 \\ & & & 1 & -4 & 5 & -2 \\ & & & & 1 & -2 & 1 \end{pmatrix} \qquad (11)$$

the matrix of the weighted spline filter for non-periodic data can be expressed as $$(W + \alpha Q)S = WY \text{ where} \qquad (12)$$

$$W = \begin{pmatrix} w_0 & & & & & \\ & w_1 & & & & \\ & & \ddots & & & \\ & & & w_{n-3} & & \\ & & & & w_{n-2} & \\ & & & & & w_{n-1} \end{pmatrix} \qquad (13)$$

$$S = \begin{pmatrix} s_0 \\ s_1 \\ \vdots \\ s_{n-3} \\ s_{n-2} \\ s_{n-1} \end{pmatrix} \quad Y = \begin{pmatrix} y_0 \\ y_1 \\ \vdots \\ y_{n-3} \\ y_{n-2} \\ y_{n-1} \end{pmatrix}$$

Next, in order to represent the weighted spline filter for periodic measurement data as a matrix, when periodic boundary condition of the periodic measurement data is represented as $$s_{k+n} = s_k \quad k = 0, 1, \cdots, n-1 \qquad (14)$$

since $$\frac{\partial I}{\partial s_k} = -2w_k(y_k - s_k) + 2\alpha(s_{k+2} - 4s_{k+1} + 6s_k - 4s_{k-1} + s_{k-2}) \qquad (15)$$

$$k = 0, 1, \cdots, n-1$$

for $$\tilde{Q} = \begin{bmatrix} 6 & -4 & 1 & & & & 1 & -4 \\ -4 & 6 & -4 & 1 & & & & 1 \\ 1 & -4 & 6 & -4 & 1 & & & \\ & \ddots & \ddots & \ddots & \ddots & \ddots & & \\ & & 1 & -4 & 6 & -4 & 1 & \\ 1 & & & 1 & -4 & 6 & -4 \\ -4 & 1 & & & 1 & -4 & 6 \end{bmatrix} \qquad (16)$$

the matrix of the weighted spline filter for periodic measurement data can be represented as $$(W + \alpha \tilde{Q})S = WY \qquad (17)$$

The amplitude characteristic and phase characteristic of the spline filter at steady state will be described below.

Following spline filter formula $$y_k = s_k + \alpha(s_{k+2} - 4s_{k+1} + 6s_k - 4s_{k-1} + s_{k-2}) \quad k = 0, 1, \ldots, n-1 \qquad (18)$$

where weight $W = I$ (unit matrix), is expressed by z-transform as $$y_k = s_k + \alpha(z^{-2} - 4z^{-1} + 6 - 4z + z^2)s_k \qquad (19)$$

Transfer function $H(z)$ of the spline filter is represented by $$H(z) = \frac{s_k}{y_k} \qquad (20)$$
$$= \frac{1}{1 + \alpha(z^{-2} - 4z^{-1} + 6 - 4z + z^2)}$$

In order to examine the amplitude characteristic and phase characteristic, Z is substituted as $$z = e^{j\omega \Delta x} \qquad (21)$$

so that following formula is established.

$$H(\omega) = \frac{1}{1 + \alpha(e^{-2j\omega\Delta x} - 4e^{-j\omega\Delta x} + 6 - 4e^{j\omega\Delta x} + e^{2j\omega\Delta x})} \qquad (22)$$

Since $$e^{-j\alpha} + e^{j\alpha} = 2\cos\alpha \qquad (23)$$

following equation is established.

$$e^{-2j\omega\Delta x} - 4e^{-j\omega\Delta x} + 6 - 4e^{j\omega\Delta x} + e^{2j\omega\Delta x} = \qquad (24)$$
$$2\cos(2\omega\Delta x) - 8\cos(\omega\Delta x) + 6 =$$
$$2 - 4\sin^2(\omega\Delta x) - 8\cos(\omega\Delta x) + 6 = -16\sin^2\left(\frac{\omega\Delta x}{2}\right)\cos^2\left(\frac{\omega\Delta x}{2}\right) -$$

-continued
$$8 + 16\sin^2\left(\frac{\omega\Delta x}{2}\right) + 8 = 16\sin^4\left(\frac{\omega\Delta x}{2}\right)$$

Accordingly, amplitude characteristic can be represented as $$|H(\omega)| = \frac{1}{1 + 16\alpha \sin^4\left(\frac{\omega\Delta x}{2}\right)} \qquad (25)$$

On the other hand, the phase characteristic is represented as $$Arg^*H(\omega) = 0 \qquad (26)$$

and it is proved that the spline filter is a phase-compensating filter.

As an example, when a filter of 50% attenuation at a cutoff frequency $\omega = \omega_C$ is to be obtained, the amplitude characteristic may be set as $$H(\omega_c) = \frac{1}{2} \qquad (27)$$

and a constant a can be expressed as in the following equation.

$$\alpha = \frac{1}{16\sin^4\left(\frac{\omega_c \Delta x}{2}\right)} \qquad (28)$$

The transfer characteristic (amplitude characteristic, phase characteristic) of the 50% attenuation filter at the cutoff frequency $\omega = 107_C$ will be shown in FIG. 5.

Next, solution of thus defined weighted spline filter will be described below.

The matrix form of the weighted spline filter $$(W + \alpha Q)S = WY \qquad (29)$$

has symmetric matrix $$M = W + \alpha Q \qquad (30)$$

on the coefficient matrix at the left-side of the equation.

Decomposition of M into lower triangular matrix L and diagonal matrix D by modified Cholesky decomposition (decomposition of the matrix M can be very efficiently conducted since the matrix M is a sparse matrix) results in $$M = LDL^T \qquad (31)$$

and the weighted spline filter can be represented as $$LDL^T S = WY \qquad (32)$$

When $$DL^T S = X \qquad (33)$$

then $$LX = WY \qquad (34)$$

Since L is a lower triangular matrix, X can be easily calculated. Further, since $$L^T S = D^{-1} X \quad (35)$$

S can be easily calculated based on the calculated X.

In actually applying the present invention, the matrix M may become singular when $$w_k^m = 0 \quad (36)$$

Accordingly, it is ideally preferable that the matrix is solved by singular value decomposition method. However, when singular value decomposition method is employed, a great-capacity storage and much processing time are required. On the other hand, in applying the present invention to the actual measurement data, it is rare that the matrix M becomes singular, and when the matrix M is singular, it is presumed that the measurement data itself is defective. Therefore, Gill-Murray modified Cholesky decomposition capable of outputting some solution even when the matrix M is singular is applied to achieve both calculation efficiency and countermeasure for singular matrix.

Weighted spline filter supported by a solution can be deduced as described above and a robust spline filter is obtained by repeating calculation until convergence condition is satisfied while updating the weight W.

FIG. 1 is a flowchart showing a first process and FIG. 2 is a functional block diagram of a device executing the robust spline processing, with a processor for spline processing 8.

In the above process, a measurement data input step for inputting a measurement data and a selecting step (ST3) for selecting weighted spline filter formula are initially executed.

During the measurement data input step, a step ST1 for inputting the measurement data from a measuring instrument etc. by an input unit 1 to store the data in a storage (or memort device) 2 of a computer, and a step ST2 for deleting locally isolated singular point data contained in the stored measurement data by a singular point data deleting unit 3 are executed.

In the present reference technology, the measurement data is a one-dimensional time-series data measured by a roughness-measuring machine, where, for instance, a probe of a surface roughness tester is moved in a direction (x-direction) to obtain a roughness data y at a predetermined pitch in x-direction. Whether a data is a singular point data or not can be easily determined by checking whether deviation of the measurement data relative to least square curve is not less than a predetermined value and not more than a predetermined width or not.

Subsequently, in the selecting step ST3, whether the measurement data is non-periodic or periodic is judged by a judging unit 4 and weighted spline filter formula is selected in accordance with the judgment. Specifically, the formula (12) and the formula (17) are selectably used in accordance with the judgment whether the measurement data is non-periodic or periodic.

Next, initializing step (ST4) is conducted, where an initial value $S^0$ of the output of the spline filtering when W=I is obtained, as illustrated (non-robust spline filtering calculation).

Next, based on the measurement data Y and $S^m$ (m indicates repetition step), weight $W^m$ is adjusted and determined by a weight adjuster 5 according to below-described process (ST5).

Subsequently, spline filter output $S^{m+1}$ is calculated based on weighted spline filter $$(W^m + \alpha Q) S^{m+1} = W^m Y \quad (37)$$

by a spline filter output calculator 6 (ST6).

Then, below-described weight convergence judgment (ST7) is conducted by a convergence judging unit 51 and, when convergence condition is not satisfied, m is updated (m=m+1) (ST10) to re-adjust the weight $W^m$ (ST5).

When the convergence condition is satisfied (ST7: YES), the repeating process is terminated to obtain the output value $S^m$ (ST8) and the spline curve is outputted to an output unit 7.

In the above process, in order to adjust the weight $W^m$ (ST5), adaptive biweight method is applied as follows.

$$w_k^m = \begin{cases} \left[1 - \left(\frac{y_k - s_k^m}{\beta \cdot c}\right)^2\right]^2 & |y_k - s_k^m| < \beta \cdot c \\ 0 & |y_k - s_k^m| \geq \beta \cdot c \end{cases} \quad (38)$$

Here, with reference to σ denoting standard deviation of the residual error, $$\beta = \text{median}\left\{\left|\frac{y_k - s_k^m}{\sigma}\right|\right\} \quad (39)$$

$$c = \begin{cases} 6 & \beta \leq 5 \\ 10 & 5 < \beta \leq 100 \\ 20 & 100 < \beta \end{cases} \quad (40)$$

are set.

Also, as to the convergence condition in ST7, the repetitive process is brought to an end at the time point that a change in the weight became smaller sufficiently and a formula shown below has been satisfied.

$$\sum_{k=0}^{n-1} |w_k^m - w_k^{m-1}| < 0.02 \cdot \sum_{k=0}^{n-1} w_k^m \quad (41)$$

FIG. 3A and FIG. 3B show examples where a signal-processing method by the robust spline filtering in the first reference technology is conducted for a one-dimensional time-series data. Here, both of a spline curve processed by normal spline filtering and a spline curve processed by the robust spline filtering according to the present invention are applied on the measurement data applied with a spike noise, which are shown in a superposing manner. As shown in the drawings, though the result of normal spline filtering is influenced by the spike noise, a spline curve along original shape is obtained by the robust spline filtering. Further, as shown in FIG. 3A, excellent trackability for a shape having gentle waviness can be obtained.

According to the present reference technology, following advantages can be obtained.

(1) Since the spline filter can be easily robustized (i.e. made robust), the deformation at the start or end area of the measurement data can be prevented. Accordingly, the shape contained in a measurement data can be extracted without being influenced by trackability for waviness component or noise component contained in the measurement data, so that filtering with excellent shape trackability can be conducted and the reliability of the measurement data can be further improved.

(2) Since locally isolated singular point data contained in the measurement data can be removed, reliability of the robust spline filtering can be further enhanced.

(3) Since the weight becomes small in accordance with the magnitude of deviation of the measurement data from the spline curve calculated by the weighted spline filter formula, robust spline filtering without being influenced by the singular point data contained in the measurement data is possible.

(4) Since weight convergence can be judged when the variation of weight in the repetition loop process becomes smaller than a predetermined value, unnecessary repetition loop process can be prevented, thereby reducing the robust spline filtering processing time.

<Second Reference Technology>

Next, second processing steps for achieving a robust spline filter will be described below. Though the steps are the same as the first processing steps, different calculation formulae are used therein.

Specifically, the weighted spline filter formula $$(W+\alpha Q)S=WY \tag{42}$$

is modified as $$(I+\alpha Q)S=WY+(I-W)S \tag{43}$$

Here, $$(I+\alpha Q)S^{m+1}=W^m Y+(I-W^m)S^m \tag{44}$$

is used in repetition step m.

In the second processing step, following advantage as well as the advantages (1) to (4) in the first processing step can be expected.

(5) Since the left-side coefficient matrix $$I+\alpha Q \tag{45}$$

constantly represents the same value during the repetition step, total robust spline filtering processing time can be reduced.

<Third Reference Technology>

Next, a signal-processing method for a measurement data as a two-dimensional data measured two-dimensionally will be described below as a third reference technology of the signal-processing method of the present invention. Here, the measurement data as a two-dimensional data refers to, for instance, (x, y) coordinates value etc. obtained by measuring contour curve of a workpiece under constant z-coordinate by a predetermined pitch using a coordinate measuring machine and the like or a data obtained by importing a figure drawn on a plane with a scanner. In other words, though the object to be processed is only y-coordinate in the first reference technology, both of x-coordinate and y-coordinate are processed in the third reference technology.

The basic arrangement of the third reference technology is the same as the first reference technology, which is characterized in a formula corresponding to the formula (6) in starting the calculation of spline curve s.

In the third reference technology, under the condition that the spline energy is minimized, a spline curve for minimizing sum of squares of the X and Y-direction distance between the measurement data $(x_k, y_k)$ and point $(s_x(x_k, y_k), s_y(x_k, y_k))$ on the spline curve s corresponding to the measurement data $(x_k, y_k)$ is calculated. In other words, under the above incidental condition, a spline curve s capable of minimizing I(s) represented by the following formula is calculated.

$$I(s) = \sum_{k=0}^{n-1} w_k[\{x_k - s_x(x_k, y_k)\}^2 + \{y_k - s_y(x_k, y_k)\}^2] + \alpha \sum_{k=0}^{n-1} \{\nabla_x^2 s(x_k, y_k) + \nabla_y^2 s(x_k, y_k)\} \tag{46}$$

In the above, secondary approximation of laplacian on the second term of right side is represented as follows:

$$\nabla_x^2 s(x_k, y_k) = s_x(x_{k+1}) - 2s_x(x_k) + s_x(x_{k-1})$$
$$\nabla_y^2 s(x_k, y_k) = s_y(y_{k+1}) - 2s_y(y_k) + s_y(y_{k-1}) \tag{47}$$

Then, weighted spline filter described in the first reference technology is applied for each x component and y component (see formula (37)).

In the above, the constant α can be calculated based on a sampling pitch Δl along measurement path and a cutoff wavelength λc' according to the following formula:

$$\alpha = \frac{1}{16 \sin^4\left(\frac{\pi \cdot \Delta l}{\lambda'c}\right)} \tag{48}$$

Then, a spline filter for deducing the spline curve for each section of the two-dimensional measurement data can be constructed.

Further, in a robust spline filter where the processing is repeated by updating the weight W until the convergence condition (formula (41)) is satisfied, $(y_k-s_k^m)$ in formula (38) is set as a distance between two points as represented in the following formula, which specifically is a distance between the measurement data $(x_k, y_k)$ and the point $(s_x(x_k, y_k), s_y(x_k, y_k))$ on the spline curve s corresponding to the measurement data $(x_k, y_k)$.

$$d_k = \sqrt{\{x_k - s_x(x_y, y_k)\}^2 + \{y_k - s_y(x_k, y_k)\}^2} \tag{49}$$

The convergence of the weight W calculated by the formula (38) applying the formula (49) is judged based on the formula (41). When the weight W is converged, a spline curve corresponding to measurement data is calculated based on the output value $S^m$ (spline function). The spline curve is outputted to the output unit.

Figure 4A:
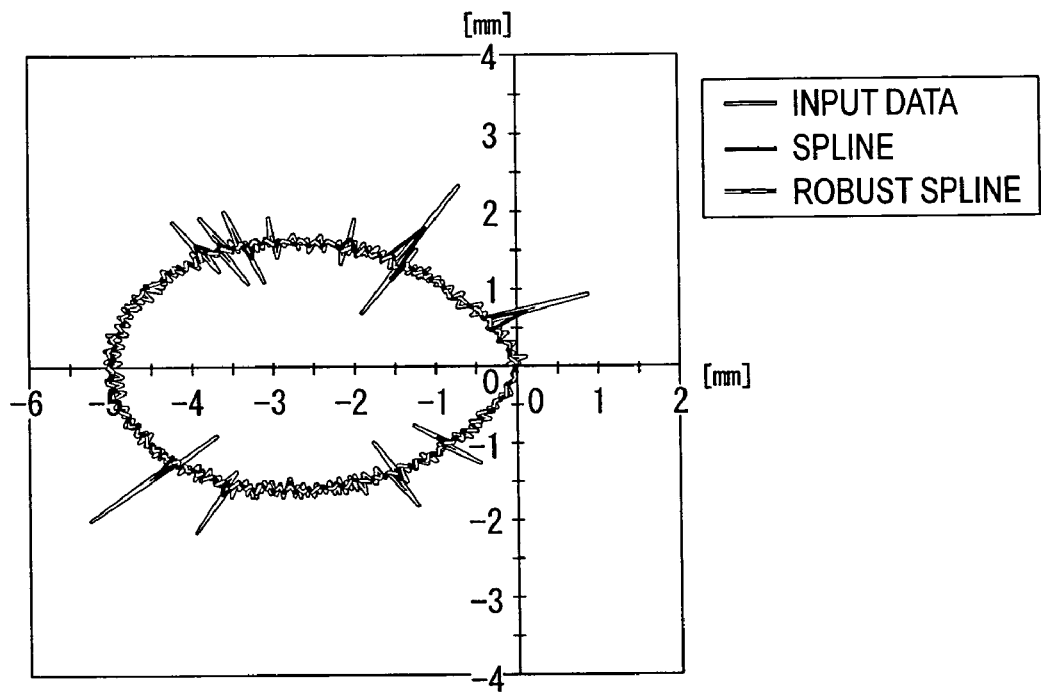
FIG. 4A and FIG. 4B are illustrations comparing a result of spline processing and a result of robust spline processing in a third reference technology.
Figure 4B:
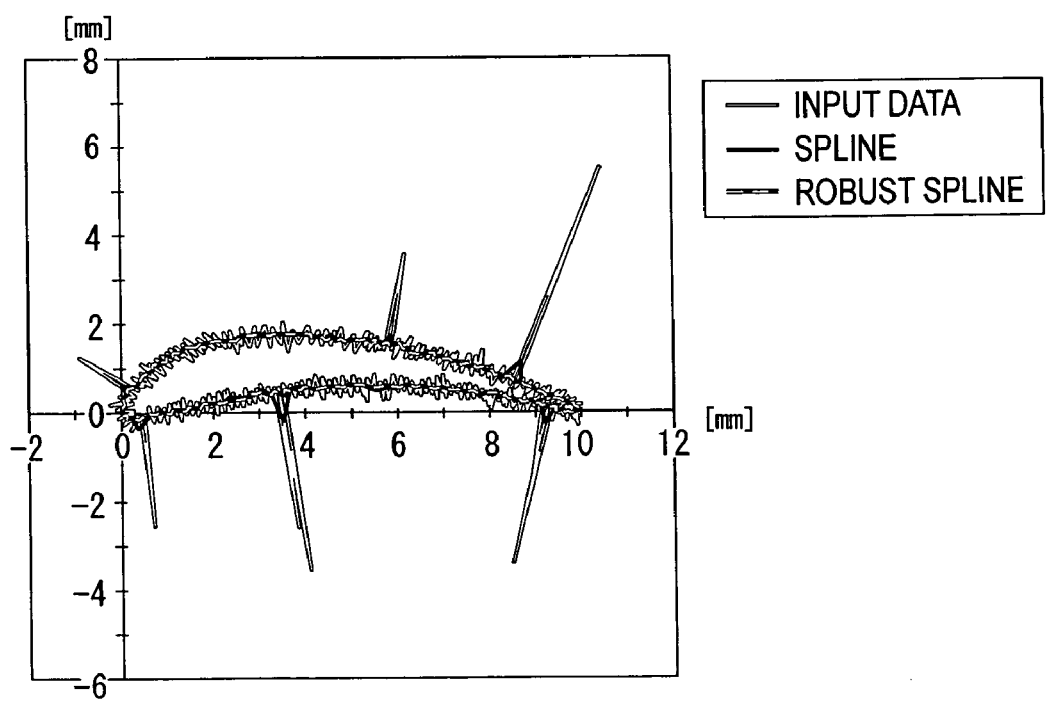

FIG. 4A shows a comparison of a result of spline processing on an input data applying spike nose on a folium and a result of robust spline processing thereon. As shown in FIG. 4A, though the result by the ordinary spline processing is influenced by the spike noise, robust result restraining the spike noise can be obtained by the robust spline processing. FIG. 4B shows a result of spline processing on an input data applying spike noise on an airfoil and a result of robust spline processing thereon, which exhibits the same result as FIG. 4A.

According to the third reference technology, following advantages as well as the advantages (1) to (5) in the first and the second reference technology can be obtained.

(6) When the measurement data is two-dimensional data on an orthogonal coordinates, since the deviation of the measurement data from the spline curve is determined based on the sum of squares of the components for the respective axes (for instance, X-axis component and Y-axis component), the deviation can be easily calculated. Accordingly, the weight of the respective measurement data can be easily determined.

(7) Even when the measurement data is two-dimensional data, since the spline filter output can be obtained based on the result of weighted spline filtering for the respective axes components (for instance, X-axis component and Y-axis component), the calculation process can be simplified even for a complicated curve, so that the time required for robust spline filtering calculation on a measurement data can be reduced.

(8) When two-dimensional data is obtained by profiling a workpiece on a two-dimensional plane to input as a measurement data, since the measurement data is inputted at a predetermined interval along the measurement path, shape-changing point (e.g. changing point from straight line to arc or boundary point of a step) can be more accurately recognized as compared to an arrangement where the measurement data is inputted at a predetermined interval in X-axis direction. In other words, shape judgment error can be prevented and highly reliable measurement data can be inputted.

<Fourth Reference Technology>

Next, a signal-processing method for a measurement data as a three-dimensional data measured three-dimensionally will be described below as a fourth reference technology of the signal-processing method of the present invention. Here, the measurement data as a three-dimensional data refers to, for instance, (x, y, z) coordinates value etc. obtained by measuring a surface of a workpiece at a predetermined pitch using a coordinate measuring machine and the like. In other words, though the object to be processed is only y-coordinate in the first reference technology, all of x-coordinate, y-coordinate and z-coordinate are processed in the fourth reference technology.

The basic arrangement of the fourth reference technology is the same as the first reference technology, which is characterized in a formula corresponding to the formula (6) in starting the calculation of spline curve s.

In the fourth reference technology, under the condition that the spline energy is minimized, a spline curve for minimizing sum of squares of the X, Y and Z-direction distance between the measurement data $(x_k, y_k, z_k)$ and point $(s_x(x_k, y_k, z_k), s_y(x_k, y_k, z_k), s_z(x_k, y_k, z_k))$ on the spline curve s corresponding to the measurement data $(x_k, y_k, z_k)$ is calculated. In other words, under the above incidental condition, a spline curve s capable of minimizing I(s) represented by the following formula is calculated.

$$I(s) = \sum_{k=0}^{n-1} [\{x_k - s_x(x_k, y_k, z_k)\}^2 + \{y_k - s_y(x_k, y_k, z_k)\}^2 + \{z_k - s_k(x_k, y_k, z_k)\}^2] + \alpha \sum_{k=0}^{n-1} \{\nabla_x^2 s(x_k, y_k, z_k) + \nabla_y^2 s(x_k, y_k, z_k) + \nabla_z^2 s(x_k, y_k, z_k)\} \quad (50)$$

In the above, secondary approximation of laplacian on the second term of right side is represented as in the third reference technology.

Then, weighted spline filter described in the first reference technology is applied for each x, y and z component (see formula (37)). Incidentally, the constant $\alpha$ is defined based on a sampling pitch $\Delta 1$ along measurement path in the three-dimensional space and cutoff wavelength $\lambda_c'$ according to the formula (48).

Then, a spline filter for deducing the spline curve for each section of the three-dimensional measurement data can be constructed.

Further, in a robust spline filter where the processing is repeated by updating the weight W until the convergence condition (formula (41)) is satisfied, $(y_k - s_k^m)$ in formula (38) is set as a distance between two points as represented in the following formula, which specifically is a distance between the measurement data $(x_k, y_k, z_k)$ and point $(s_x(x_k, y_k, z_k), s_y(x_k, y_k, z_k), s_z(x_k, y_k, z_k))$ on the spline curve s corresponding to the measurement data $(x_k, y_k, z_k)$.

$$d_k = \sqrt{\{x_k - s_x(x_k, y_k, z_k)\}^2 + \{y_k - s_y(x_k, y_k, z_k)\}^2 + \{z_k - s_z(x_k, y_k, z_k)\}^2} \quad (51)$$

The convergence of the weight W calculated by the formula (38) applying the formula (51) is judged based on the formula (41). When the weight W is converged, a spline curve corresponding to measurement data is calculated based on the output value $S^m$ (spline function). The spline curve is outputted to the output unit.

According to the fourth reference technology, following advantage as well as the advantages (1) to (5) of the advantages of the first and the second reference technologies can be obtained.

(9) The advantages (6) to (8) of the third reference technology can be further achieved in a three-dimensional data. Accordingly, when the measurement data is a three-dimensional data, calculation load can be reduced without increasing processing time of the robust spline filtering.

<Reference Variant>

A modification of the present invention will be described below. Though the spline curve at the time of convergence judgment in the first reference technology is directly outputted as a result of signal-processing, the spline curve is re-calculated and the result is outputted as the signal-processing result in the present modification.

Figure 6:
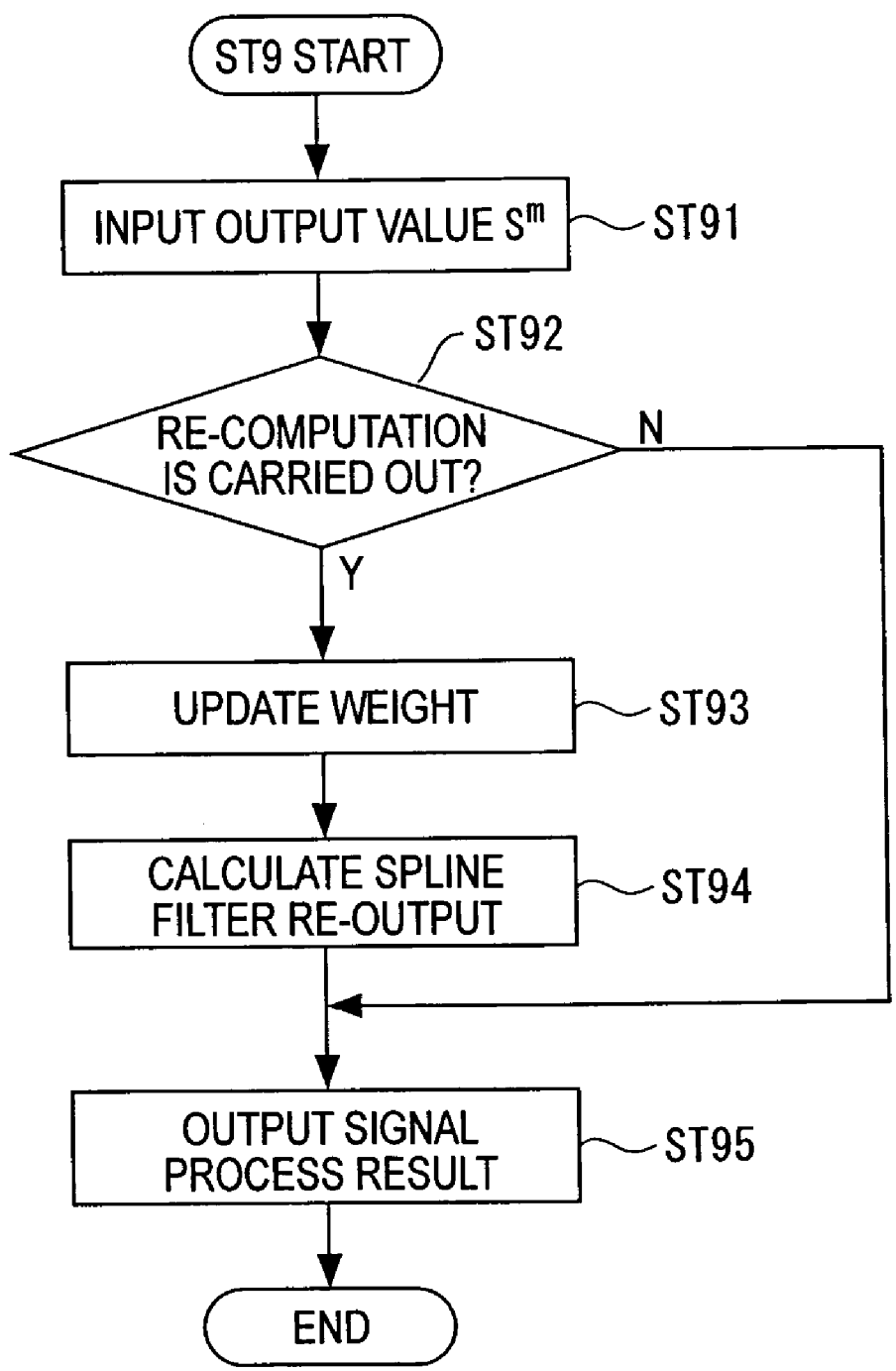
FIG. 6 is a flowchart showing a modification of the present invention.

FIG. 6 shows a modification of spline curve output (ST9) of FIG. 1.

Initially, the calculated output value $S^m$ is inputted (ST91). Subsequently, whether re-calculation is to be conducted or not is determined (ST92). For instance, "YES" is selected when highly accurate signal-processing result is to be obtained and "NO" is selected when it is considered that sufficient accuracy has been obtained by an operator at the time, or in advance.

When the re-calculation is not conducted (NO), the spline curve of the output value $S^m$ is outputted by the output unit 7. When the re-calculation is to be conducted (YES), weight exceeding a predetermined value designated in advance is updated to 1 and weight not greater than a predetermined value is updated to 0 (ST93). In other words, the measurement data having weight exceeding the predetermined value is judged effective and 100% contribution on the spline processing is set thereon and the measurement data having weight not greater than the predetermined value is judged inefficient and 0% contribution is set.

Subsequently, weighted spline filtering is conducted based on the updated weight to obtain an output (ST94). The obtained spline curve is outputted by the output unit 7 as a signal-processing result (ST95).

The reference variant can be applied on all of the first to fourth reference technologies, where the following advantage as well as the advantages (1) to (9) can be obtained.

(10) The weight is updated to 1 when the weight at the time when the weight is judged converged exceeds a predetermined value, and the spline filter output is obtained again to output the result as the signal-processing result. In other words, when the weight is judged converged after repeating the weight adjusting step and the spline filter output calculating step, the measurement data at the point where the weight exceeds the predetermined value is considered effective to update the weight thereof to 1, and the spline filter output can be re-calculated, so that the robust spline processing for the measurement data can be more securely conducted. Further, since the result is outputted as the signal processing result, a spline curve having sufficiently small error relative to the original shape component contained in the measurement data can be obtained, thus conducting robust spline filter processing with excellent shape trackability.

<First Embodiment>

Next, the signal processing method for the curved surface data measured in the surface area will be explained as a first relating to the signal processing method of the present invention.

Herein, the so-called curved surface data signifies, for example, surface roughness data or form data etc. obtained by scanning the surface of the object to be measured by the coordinate measuring machine or the surface texture measuring machine.

And, this first embodiment relates to a method of filter-processing measurement data $f_i$ $(x_i, y_i)$ of the surface at a sampling position $(x_i, y_j)$, thereby to obtain a curved surface $z = s(x, y)$ having the disturbance component or the high-frequency component removed.

A basic processing procedure of the first embodiment is similar to that of the first reference technology or the second reference technology; however its special feature lies in an formula of a bending energy of the spline and so on, which is caused by the fact that data to be applied is curved surface data.

A sum of squares of the weighted residual between the measurement data $f_i$ $(x_i, y_i)$ of the surface at the sampling position $(x_i, y_i)$ and the curved surface $z = s(x, y)$ to be obtained after the filter process is expressed by the following formula with $w_i$ assumed to be a weight for the residual.

$$\sum_{i=0}^{n-1} w_i \cdot \{f_i - s_i(x_i, y_i)\}^2 \quad (52)$$

Also, the bending energy in a case where the surface $z = s(x, y)$ has been thought to be a thin plate is expressed by the following formula.

$$\int\int \left\{ \left(\frac{\partial^2 s}{\partial x^2}\right)^2 + \left(\frac{\partial^2 s}{\partial y^2}\right)^2 + 2\left(\frac{\partial^2 s}{\partial x \partial y}\right)^2 \right\} \cdot dx dy \quad (53)$$

Under the constraint condition that this bending energy formula (53) is minimized, obtaining s (x, y) for minimizing the sum-of-squares formula (52) of the weighted residual causes the weighted spline filter (robust spline filter) for the surface area to be defined. That is, it is expressed by the following formula with λ assumed to be a Lagrangian undetermined multiplier.

$$\sum_{i=0}^{n-1} w_i \cdot \{f_i - s(x_i, y_i)\}^2 + \quad (54)$$

$$\lambda \int\int \left\{ \left(\frac{\partial^2 s}{\partial x^2}\right)^2 + \left(\frac{\partial^2 s}{\partial y^2}\right)^2 + 2\left(\frac{\partial^2 s}{\partial x \partial y}\right)^2 \right\} \cdot dx dy \to \min_{s(x_i, y_k)}$$

Figure 13:
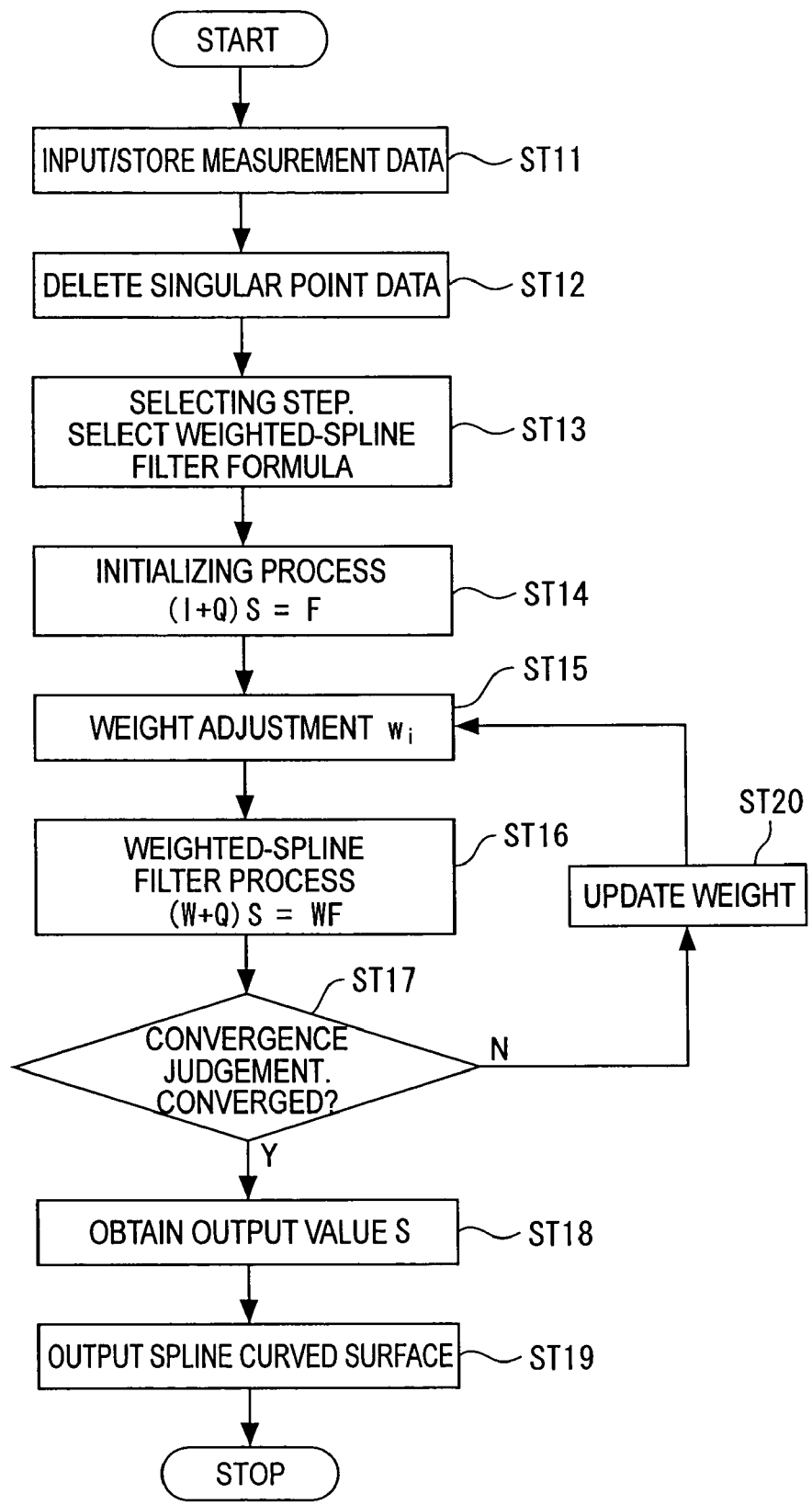
FIG. 13 is a flowchart illustrating a signal process in the first embodiment relating to the signal processing method.

As mentioned above, the weighted spline filter on the measurement data of the surface area has been defined. Thereupon, by solving the weighted spline filter repeatedly while updating the weight for the residual according to the Biweight method it is made possible to obtain the robust spline filter on the measurement data of the surface area. Additionally, the computation for updating the weight is carried out with the formula (38) to the formula (41) explained in the first reference technology. And, such processes are realized with the flowchart of FIG. 13 and the functional block diagram of FIG. 2.

As one example, a case will be explained of signal-processing the measurement data of the surface, which has been sampled in a lattice shape. The sampling intervals in the x direction and in the y direction are assumed to be Δx and Δy respectively, and the data numbers in the x direction and in the y direction are assumed to be nx and ny respectively. And, upon assuming height data at a sampling position $(x_k, y_l)$ to be $f_{k,l}$, an formula I (s) for defining the weighted spline filter is expressed by the following expression.

$$I(s) = \sum_{l=0}^{ny-1} \sum_{k=0}^{nx-1} w_{k,l} \cdot (f_{k,l} - s_{k,l})^2 + \quad (55)$$

$$\lambda \int\int \left\{ \left(\frac{\partial^2 s}{\partial x^2}\right)^2 + \left(\frac{\partial^2 s}{\partial y^2}\right)^2 + 2\left(\frac{\partial^2 s}{\partial x \partial y}\right)^2 \right\} \cdot dx dy$$

Herein, digitizing the second term yields the following formula.

$$I(s) = \sum_{l=0}^{ny-1} \sum_{k=0}^{nx-1} w_{k,l} \cdot (f_{k,l} - sx_{k,l})^2 + \quad (56)$$

$$\lambda \Delta x \Delta y \sum_{l=0}^{ny-1} \sum_{k=0}^{nx-1} \left\{ (\nabla_x^2 s)^2 + (\nabla_y^2 s)^2 + 2(\nabla_{xy}^2 s)^2 \right\}$$

$$\nabla_x^2 s(x_k, y_l) = \frac{s_{k+1,l} - 2s_{k,l} + s_{k-1,l}}{\Delta x^2}$$

$$\nabla_y^2 s(x_k, y_l) = \frac{s_{k,l+1} - 2s_{k,l} + s_{k,l-1}}{\Delta y^2}$$

$$\nabla_{xy}^2 s(x_k, y_l) = \frac{s_{k+1,l+1} - s_{k,l+1} - s_{k+1,l} + s_{k,l}}{\Delta x \Delta y}$$

Herein, boundary conditions are given by the following formulas (57).

$\nabla_x^2 s(x_0, y_l) = \nabla_x^2 s(x_{n_x-1}, y_l) = 0 \quad l = 0, 1, \ldots, n_y - 1$ $\nabla_y^2 s(x_k, y_0) = \nabla_y^2 s(x_k, y_{n_y-1}) = 0 \quad k = 0, 1, \ldots, n_x - 1$ $\nabla_{xy}^2 s(x_0, y_l) = \nabla_{xy}^2 s(x_{n_x-1}, y_l) = 0 \quad l = 0, 1, \ldots, n_y - 1$ $\nabla_{xy}^2 s(x_k, y_0) = \nabla_{xy}^2 s(x_k, y_{n_y-1}) = 0 \quad k = 0, 1, \ldots, n_x - 1 \quad (57)$ Then, the following matrix expression is obtained.

$$(W+Q)S = WF \quad (58)$$

Herein, W is an n×n diagonal matrix with a weight $w_i$ assumed to be a diagonal element, Q is an n×n coefficient matrix, S is an n-dimensional filter output vector, and F is an n-dimensional filter input vector, where n=nx×ny.

In the above-mentioned formula (58), making a solution thereof for S with W set to W=I (unit matrix) allows the output of the spline filter relating to the surface area to be obtained. This is equivalent to ST 14 in FIG. 13.

Also, by making a solution repeatedly while updating the weight matrix it is made possible to obtain the output of the robust spline filter for the surface area. This is equivalent to ST 15, ST 16, ST 17, and ST 20 in FIG. 13.

In FIG. 7 to FIG. 11, results obtained by applying the robust spline filter on the measurement data of the surface area are shown.

Figure 7:
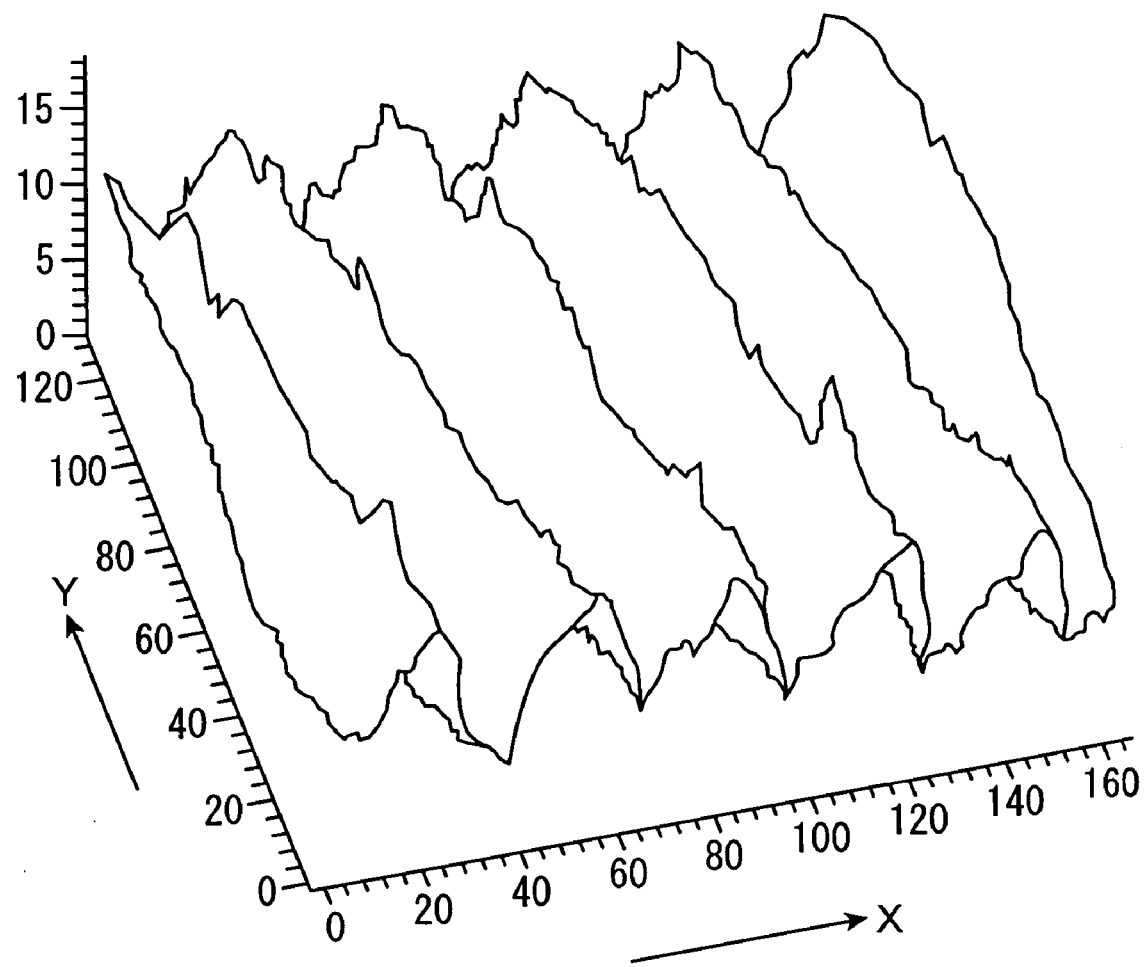
FIG. 7 is a view illustrating an example of measurement data to be applied for a first embodiment.
Figure 8:
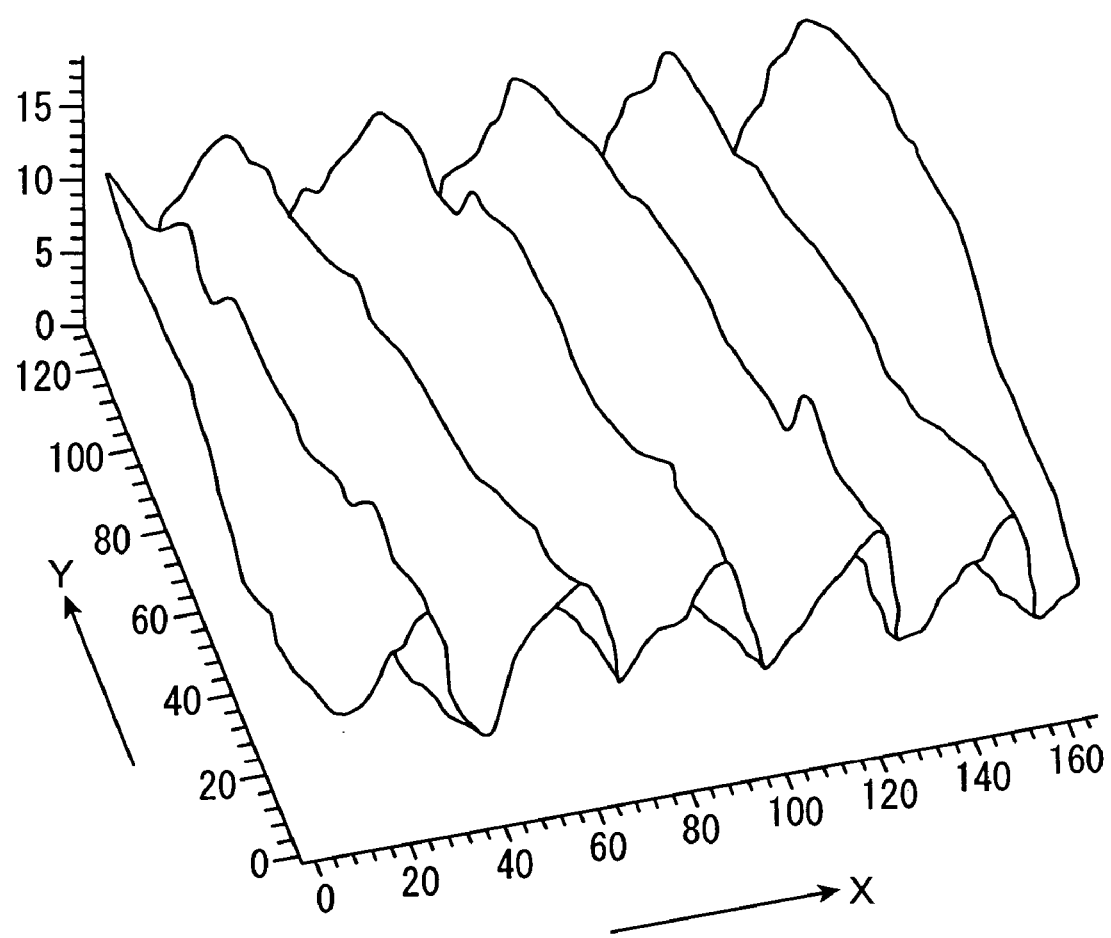
FIG. 8 is a view illustrating a result obtained by applying the robust spline filter on the measurement data to be shown in FIG. 7 in the first embodiment.
Figure 9:
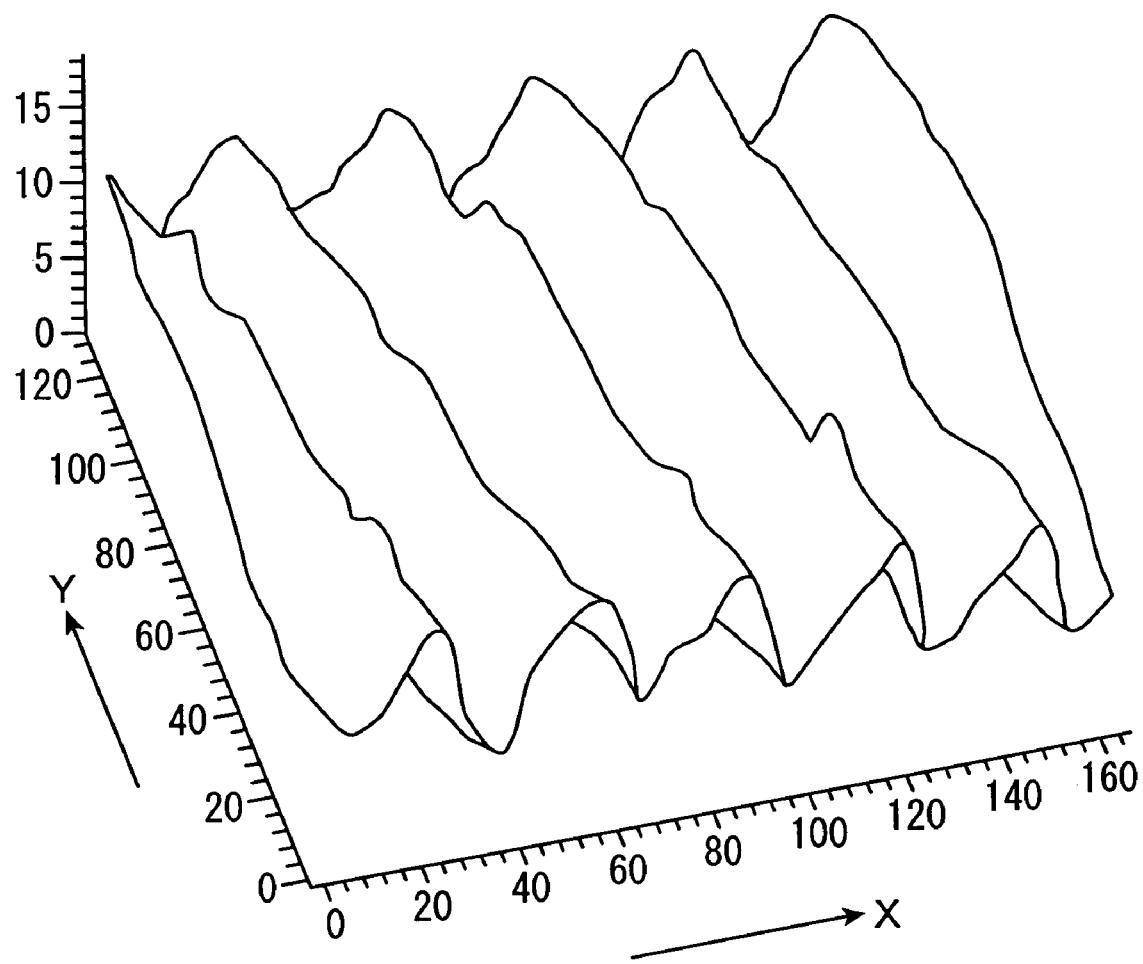
FIG. 9 is a view illustrating a result obtained by processing the measurement data to be shown in FIG. 7 with a Gaussian filter.

FIG. 7 is a view illustrating measurement data obtained in the measurement, and FIG. 8 is a view illustrating a result obtained by applying the robust spline filter on the measurement data of FIG. 7. And, in FIG. 9, a result obtained by applying the Gaussian filter on the measurement data of FIG. 7 is shown as a comparative example.

Figure 10:
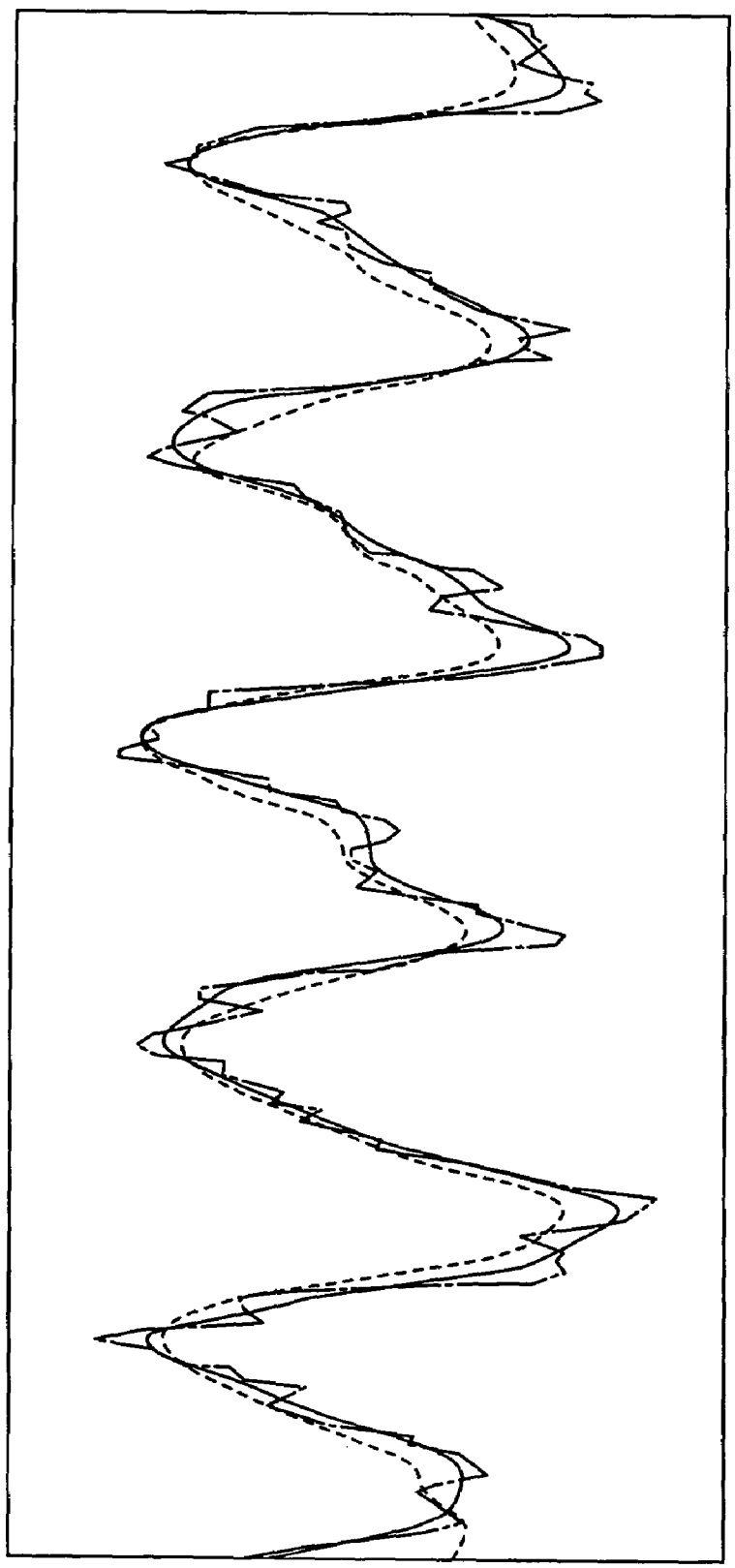
FIG. 10 is a view illustrating a profile in the X direction in FIG. 7 in the first embodiment.
Figure 11:
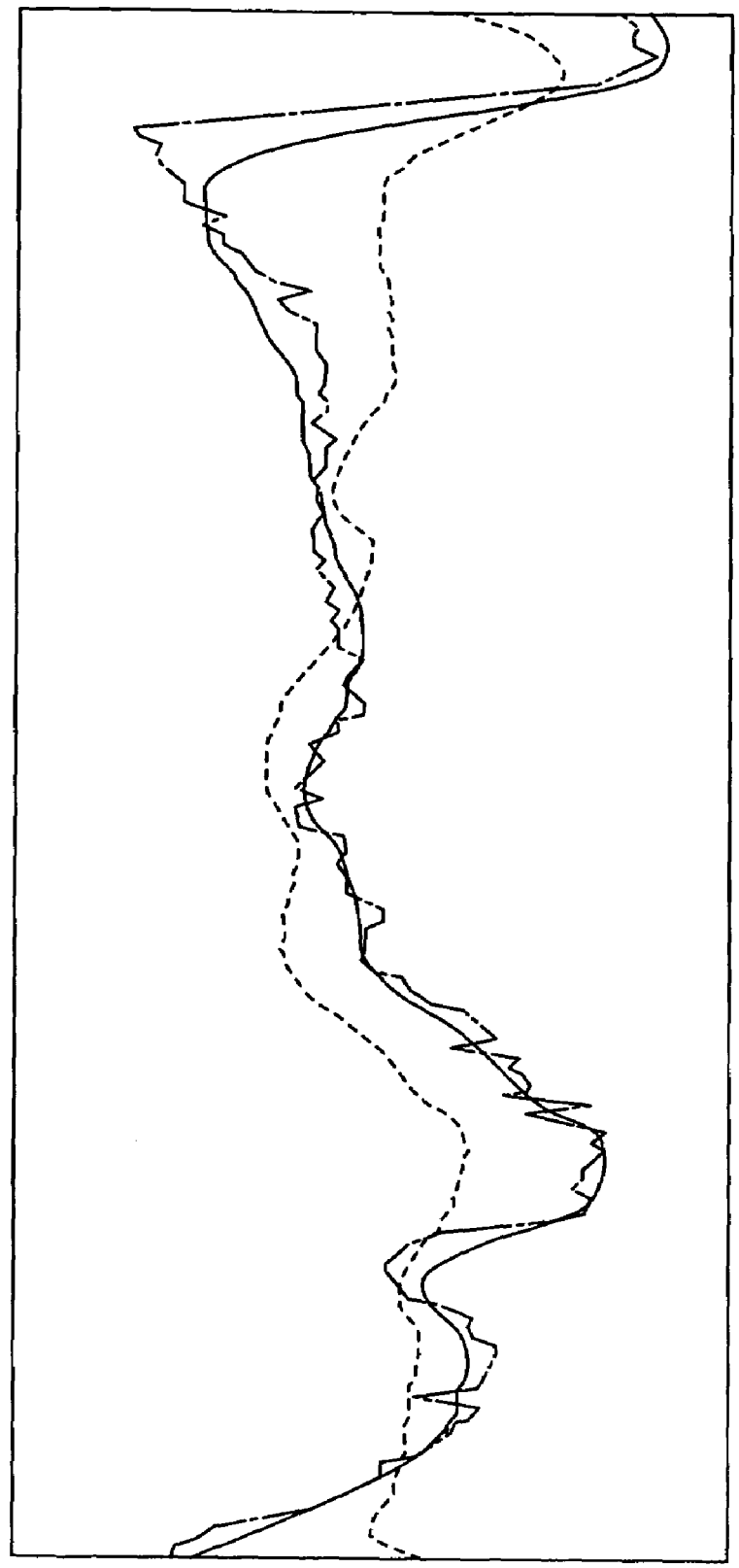
FIG. 11 is a view illustrating a profile in the Y direction in FIG. 7 in the first embodiment.

Also, in FIG. 10, a sectional profile along the X direction of FIG. 7 is shown, and in FIG. 11, a sectional profile along the Y direction of FIG. 7 is shown.

As shown in the profiles of FIG. 10 or FIG. 11, it is seen that the signal process by the robust spline filter allows an excellent result of having exhibited trackability for the measurement data to be obtained.

Herein, the specific solving method for the curved surface data, which has been sampled in a lattice shape, has been shown; however the curved surface data such that a triangular mesh structure is formed can be also solved by employing a finite element method etc.

Next, a filter characteristic of the robust spline filter (spline filter) on the measurement data of the surface area will be explained briefly.

Expressing a transfer function in a stationary state in terms of a z transformation with the weight W set to W=1 yields the following.

$$H(z_x, z_y) = \frac{s_{k,l}}{z_{k,l}} = \frac{1}{1 + \lambda_x H_x + \lambda_y H_y + \lambda_{xy} H_{xy}} \quad (59)$$

where $$H_x(z_x) = z_x^2 - 4z_x + 6 - 4z_x^{-1} + z_x^{-2}$$

$$H_y(z_y) = z_y^2 - 4z_y + 6 - 4z_y^{-1} + z_y^{-2}$$

$$H_{xy}(z_x, z_y) =$$

$$z_x z_y + z_x z_y^{-1} + z_x^{-1} z_y + z_x^{-1} z_y^{-1} - 2z_x - 2z_y + 4 - 2z_x^{-1} - 2z_y^{-1}$$

Herein, upon assuming frequencies in the x direction and in the y direction to be $\omega_x$, and $\omega_y$ respectively, $z_x$ and $z_y$ are expressed as follows respectively.

$$z_x = e^{j\omega_x \cdot \Delta x}$$

$$z_y = e^{j\omega_y \cdot \Delta y} \quad (60)$$

Accordingly, the formula (59) is expressed as follows.

$$H(\omega_x, \omega_y) = \frac{1}{1 + \lambda_x 16\sin^4\left(\frac{\omega_x \cdot \Delta x}{2}\right) + \lambda_y 16\sin^4\left(\frac{\omega_y \cdot \Delta y}{2}\right) + \lambda_{xy} 16\sin^2\left(\frac{\omega_x \cdot \Delta x}{2}\right)\sin^2\left(\frac{\omega_y \cdot \Delta y}{2}\right)} \quad (61)$$

additionally $$H_x(\omega_x) = 16\sin^4\left(\frac{\omega_x \cdot \Delta x}{2}\right)$$

$$H_y(\omega_y) = 16\sin^4\left(\frac{\omega_y \cdot \Delta y}{2}\right)$$

$$H_{xy}(\omega_x, \omega_y) = 16\sin^2\left(\frac{\omega_x \cdot \Delta x}{2}\right)\sin^2\left(\frac{\omega_y \cdot \Delta y}{2}\right)$$

Herein, in the cut-off frequency $\omega_c$, so as to obtain a 50% attenuation characteristic, the transfer function is put as follows.

$$H(\omega_c, 0) = H(0, \omega_c) = H\left(\frac{\omega_c}{\sqrt{2}}, \frac{\omega_c}{\sqrt{2}}\right) = \frac{1}{2} \quad (62)$$

Then, it follows that the followings are obtained, whereby it can be understood that this filter is a phase compensating filter without a delay.

$$\lambda_x = \frac{1}{16\sin^4\left(\frac{\omega_c \cdot \Delta x}{2}\right)} \quad (63)$$

$$\lambda_y = \frac{1}{16\sin^4\left(\frac{\omega_c \cdot \Delta y}{2}\right)}$$

$$\lambda_{xy} = \frac{1 - 16\lambda_x \sin^4\left(\frac{\omega_c \cdot \Delta x}{2\sqrt{2}}\right) - 16\lambda_y \sin^4\left(\frac{\omega_c \cdot \Delta y}{2\sqrt{2}}\right)}{16\sin^2\left(\frac{\omega_c \cdot \Delta x}{2\sqrt{2}}\right)\sin^2\left(\frac{\omega_c \cdot \Delta y}{2\sqrt{2}}\right)}$$

Herein, it is assumed that the sampling intervals in the x direction and in the y direction are equal, a product of the frequency ω and the sampling interval is sufficiently small within an all-frequency range where the input data exists, and the following approximation formula holds.

$$\sin(\omega \cdot \Delta t) \approx \omega \cdot \Delta t$$

herein $$\Delta x = \Delta y = \Delta t \quad (64)$$

Then, the following formula holds, whereby it can be seen that assuming a sufficiently small sampling interval allows the above filter to become a filter having an isotropic transfer function practically.

$$H(\omega_x, \omega_y) \approx \frac{\omega_c^4}{\omega_c^4 + (\omega_x^2 + \omega_y^2)^2} \quad (65)$$

Figure 12:
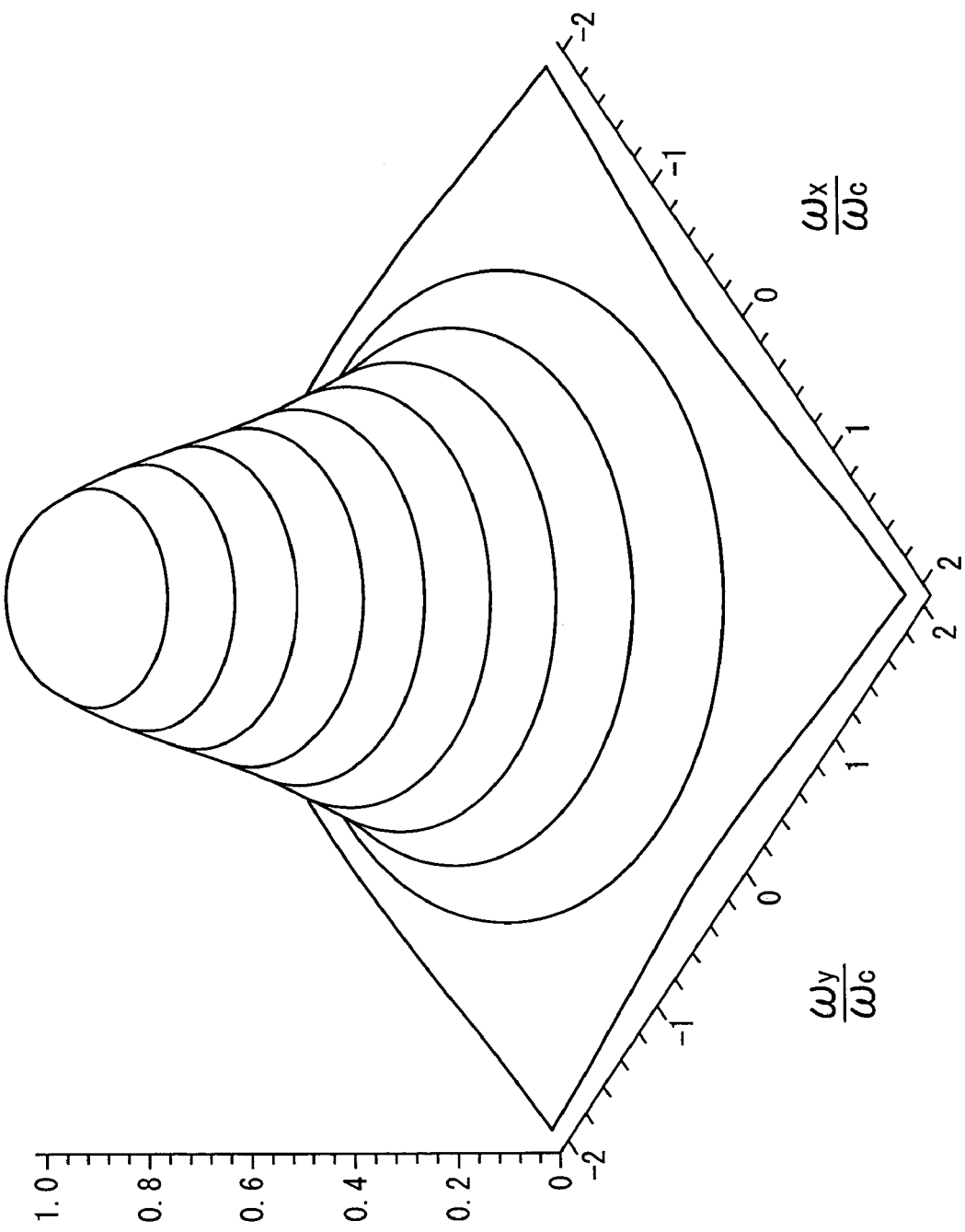
FIG. 12 is a view illustrating one example of a transfer characteristic in the first embodiment.

In FIG. 12, the transfer characteristic at the time that $\Delta x = \Delta y = \Delta z$ has been put is shown.

As mentioned above, the preferred embodiment of the present invention has been provided for explanation; however the present invention is not restricted to this embodiment described above, and various modifications may be done without departing from the spirit of the present invention.

The present invention, which is not restricted to each of these embodiments, can be carried out for, for example, all of three-dimensional roughness data, measurement data by the contour measuring machine, data measured in the roundness measuring machine, form data measured in the coordinate measuring machine, data measured in the image measuring machine, etc.

Also, irrespective of types of sensors to be employed, i.e. a contact type sensor or non-contact type sensor to be employed for collecting the measurement data, and further, without being limited to the measurement data being a surface texture data of the object to be measured, the present invention can be carried out for electric signal data etc. as well, which occurs in a time-series manner.

Further, in this embodiment, only the case where the measurement data has been once filed in the memory device has been explained; however the present invention can be carried out also in a case of performing the computing process whenever the measurement data is collected, namely, in what is called a real time basis.

Further, a signal processing program for a computer, which executes the signal processing method of the present invention, may be employed, and this signal processing program can be filed in a form, which is executable by various computers, by employing a portable-type storage medium such as a CD-ROM. Also, this signal processing program may be of compile format to be translated into a machine language, or may be of interpreter format to be translated into an intermediate language.

Also, causing the computer to execute the signal processing program enables the signal processing unit to be configured. That is, by causing the computer to execute the measurement data inputting step, the selecting step, the initializing step, the weight adjusting step, the spline filter output calculating step, the convergence determining step, and the outputting step respectively, the measurement data inputting device, the selector, the initializing device, the weight adjusting device, the spline filter output calculator, the converge judging unit, and the outputting device are configured respectively, thereby allowing the signal processing unit to be configured.

The priority application Number JP2004-010918 upon which this patent application is based is hereby incorporated by reference.

What is claimed is:

1. A signal processing method for filtering a measurement data obtained by measuring a surface area having a predetermined size, comprising the steps of:
   inputting the measurement data;
   selecting a predetermined weighted-spline filter formula;
   applying a weight on the measurement data by a unit matrix so as to obtain an initial value of a spline filter output;
   adjusting and determining the weight on the measurement data;
   calculating the spline filter output using the determined weight;
   determining convergence of the weight; and
   outputting a signal processing result based on the spline filter output,
   wherein, when it is not judged that the weight is converging, updating the weight and repeating the steps of adjusting the weight and calculating the spline filter output, and
   wherein a smoothing spline curved surface corresponding to the measurement data is generated so as to conduct a robust spline filtering on the measurement data.

2. The signal processing method according to claim 1, wherein the determined weight is adjusted to a smaller value as a deviation of the measurement data from the generated spline curve by the weighted-spline filter formula increases.

3. The signal processing method according to claim 1, wherein, the weight is converging when an amount of weight-change in the weight adjusting step becomes a predetermined value or less.

4. The signal processing method according to claim 1, wherein the output step comprises the further steps of:
   updating the weight to 1 when the weight of the measurement data exceeds a predetermined value;
   re-calculating the spline filter output based upon the updated weight; and
   outputting the re-calculated spline filter output as a signal processing result.

5. The signal processing method according to claim 1, wherein the step of inputting measurement data includes deleting a locally isolated singular point data relative to the measurement data.

6. A signal processing program executing a signal processing method for filtering a measurement data obtained by measuring a surface area having a predetermined size, with a computer, the method comprising the steps of:
   inputting the measurement data;
   selecting a predetermined weighted-spline filter formula;
   applying a weight on the measurement data by a unit matrix so as to obtain an initial value of a spline filter output;
   adjusting and determining the weight on the measurement data;
   calculating the spline filter output using the determined weight;
   determining convergence of the weight; and
   outputting a signal processing result based on the spline filter output,
   wherein, when it is not judged that the weight is converging, updating the weight and repeating the steps of adjusting the weight and calculating the spline filter output, and
   wherein a smoothing spline curved surface corresponding to the measurement data is generated so as to conduct a robust spline filtering on the measurement data.

7. A recording medium storing a signal processing program therein, wherein the program executes a signal processing method for filtering a measurement data obtained by measuring a surface area having a predetermined size, with a computer, the method comprising the steps of:
   inputting the measurement data;
   selecting a predetermined weighted-spline filter formula;
   applying a weight on the measurement data by a unit matrix so as to obtain an initial value of a spline filter output;
   adjusting and determining the weight on the measurement data;
   calculating the spline filter output using the determined weight;
   determining convergence of the weight; and
   outputting a signal processing result based on the spline filter output, wherein, when it is not judged that the weight is converging, updating the weight and repeating the steps of adjusting the weight and calculating the spline filter output, and wherein a smoothing spline curved surface corresponding to the measurement data is generated so as to conduct a robust spline filtering on the measurement data.

8. A signal processing unit executing a signal processing program with a computer, wherein the program executes a signal processing method for filtering a measurement data obtained by measuring a surface area having a predetermined size, with a computer, the method comprising the steps of:

inputting the measurement data;

selecting a predetermined weighted-spline filter formula;

applying a weight on the measurement data by a unit matrix so as to obtain an initial value of a spline filter output;

adjusting and determining the weight on the measurement data;

calculating the spline filter output using the determined weight;

determining convergence of the weight; and outputting a signal processing result based on the spline filter output, wherein, when it is not judged that the weight is converging, updating the weight and repeating the steps of adjusting the weight and calculating the spline filter output, and wherein a smoothing spline curved surface corresponding to the measurement data is generated so as to conduct a robust spline filtering on the measurement data.

* * * * *